US012686104B2

(12) United States Patent
Xue

(10) Patent No.: US 12,686,104 B2
(45) Date of Patent: Jul. 21, 2026

(54) DOUBLE-HEADED RETAINING RING PLIERS

(71) Applicant: JIANGSU SAINTY SUMEX TOOLS CORP., LTD., Jiangsu (CN)

(72) Inventor: Feng Xue, Jiangsu (CN)

(73) Assignee: JIANGSU SOHO SUMEX TOOLS CORP., LTD., Jiangsu (CN)

( * ) Notice: Subject to any disclaimer, the term of this patent is extended or adjusted under 35 U.S.C. 154(b) by 258 days.

(21) Appl. No.: 18/427,784

(22) Filed: Jan. 30, 2024

(65) Prior Publication Data

US 2024/0326208 A1 Oct. 3, 2024

(30) Foreign Application Priority Data

Mar. 28, 2023 (CN) ........................ 202310314626.9

(51) Int. Cl.
*B25B 27/00* (2006.01)
*B25B 27/20* (2006.01)

(52) U.S. Cl.
CPC .................................. *B25B 27/205* (2013.01)

(58) Field of Classification Search
CPC ....... B25B 27/00; B25B 27/26; B25B 27/205; B25B 7/00; B25B 7/20
See application file for complete search history.

(56) References Cited

U.S. PATENT DOCUMENTS 7,343,657 B2 * 3/2008 Aeschliman .............. F16L 1/09 29/243.5
8,286,954 B2 * 10/2012 Zheng ........................ B25B 7/04 29/268
8,628,070 B2 * 1/2014 Neubauer ............... B25B 5/003 81/304
8,656,570 B2 * 2/2014 Foley ...................... B25C 11/02 29/268
11,904,443 B2 * 2/2024 Wu ........................... B25B 5/04

* cited by examiner

*Primary Examiner* — Lee D Wilson
(74) *Attorney, Agent, or Firm* — JCIPRNET

(57) ABSTRACT

A pair of double-headed retaining ring pliers, including handles, a left arm, and a right arm. Middle parts of the left arm and the right arm are hingedly connected by a hinge axle. The handles are divided into a left handle and a right handle. The handles are flipped to enable the retaining ring pliers to have two working states: One is used for installing an outer retaining ring, and the other is used for installing an inner retaining ring. In addition, the left arm and the right arm can be returned by a return spring.

12 Claims, 3 Drawing Sheets

DOUBLE-HEADED RETAINING RING PLIERS

CROSS-REFERENCE TO RELATED APPLICATION

This application claims the priority benefit of China application serial no. 202310314626.9, filed on Mar. 28, 2023. The entirety of the above-mentioned patent application is hereby incorporated by reference herein and made a part of this specification.

BACKGROUND

Technical Field

The present invention relates to a pair of double-headed retaining ring pliers, and belongs to the technical field of hand tools.

Description of Related Art

A retaining ring, also referred to as a circlip, is a fastener used to axially locate, lock, or stop a part on a shaft or in a hole, to prevent axial movement of the part on the shaft or in the hole. Retaining rings are divided into two main categories according to usage scenarios: outer retaining rings (customarily referred to as shaft retaining rings) used on shafts and inner retaining rings (customarily referred to as hole retaining rings) used in holes.

Retaining ring pliers (also referred to circlip pliers) are a tool used when installing a retaining ring, usually including outer retaining ring pliers for installing outer retaining rings and inner retaining ring pliers for installing inner retaining rings. When an outer retaining ring is installed, outer retaining ring pliers need to be used to increase the diameter of the outer retaining ring, that is, insert jaws into a jaw hole of the outer retaining ring to expand the retaining ring, and then, install the retaining ring into a pre-machined shaft groove. In addition, when an inner retaining ring is installed, inner retaining ring pliers need to be used to decrease the diameter of the inner retaining ring, and then, install the inner retaining ring into a preset hole.

However, at present, when outer retaining rings and inner retaining rings are installed, different pairs of retaining ring pliers need to be used respectively, and are inconvenient to carry or use. Especially, in some cases, the retaining ring pliers need to frequently switched to install outer retaining rings and inner retaining rings, resulting in more troublesome use.

SUMMARY

The technical problem to be resolved by the present invention is: to provide a pair of double-headed retaining ring pliers with both a function of installing an inner retaining ring and a function of installing an outer retaining ring, which is more convenient to carry and use.

To resolve the foregoing technical problem, the technical solution provided by the present invention is: a pair of double-headed retaining ring pliers, including handles, a left arm, and a right arm, where middle parts of the left arm and the right arm are hingedly connected by a hinge axle, and a position at which the left arm and the right arm are hingedly connected is noted as a hinge point;

a first left head and a second left head are respectively arranged at two end portions of the left arm, the left arm is divided into two sections, one section from the hinge point to the first left head is noted as a first left arm, and the other section from the hinge point to the second left head is noted as a second left arm;

a first right head and a second right head are respectively arranged at two end portions of the right arm, the right arm is divided into two sections, one section from the hinge point to the first right head is noted as a first right arm, and the other section from the hinge point to the second right head is noted as a second right arm;

the handles include a left handle and a right handle, where an end portion of the left handle is hingedly connected to an end portion of the right handle by the hinge axle;

a left support arm is arranged on the first left arm, the left support arm extends from the first left arm in a direction away from the first right arm, and an angle between the left support arm and the first left arm is less than 90°;

a right support arm is arranged on the first right arm, the right support arm extends from the first right arm in a direction away from the first left arm, and an angle between the right support arm and the first right arm is less than 90°;

a left drive lever is arranged on the left handle, a first left drive position cooperating with the left drive lever is arranged on the second left arm, and a second left drive position cooperating with the left drive lever is arranged on the right support arm;

a right drive lever is arranged on the right handle, a first right drive position cooperating with the right drive lever is arranged on the second right arm, and a second right drive position cooperating with the right drive lever is arranged on the left support arm; and a return spring is arranged between the second left arm and the second right arm.

It should be noted that, in the present invention, the left arm and the right arm is arranged crosswise. Therefore, "left" and "right" in the present invention is merely customary expressions that are used to distinguish between two different arms and are not "left" and "right" in the physical or geometric sense.

In use, the present invention has two working states: 1) When the left drive lever of the left handle abuts against the first left drive position, and the right drive lever of the right handle abuts against the first right drive position, the left and right handles are clamped to open the first left head and the first right head, for installing an outer retaining ring. 2) The handles are flipped, to abut the left drive lever of the left handle against the second left drive position and abut the right drive lever of the right handle against the second right drive position, in this case, the left and right handles are clamped to close the second left head and the second right head, for installing an inner retaining ring, and after the installation is completed, the return spring returns the left arm and the right arm to initial positions in the state 1).

In view of the above, in the present invention, by flipping the handles, one pair of retaining ring pliers is enabled to have both a function of installing an inner retaining ring and a function of installing an outer retaining ring. That is, the handles are flipped, to switch between the function of installing an inner retaining ring and the function of installing an outer retaining ring. Therefore, a product of the present invention is more convenient to carry and use, and is particularly suitable for a scenario of frequently switching between installation of an outer retaining ring and installation of an inner retaining ring. It is no longer needed to carry two different pairs of retaining ring pliers.

BRIEF DESCRIPTION OF THE DRAWINGS

The present invention is further described below with reference to the accompanying drawings.

Reference signs: 1. left handle; 2. right handle; 3. first left arm; 4. second left arm; 5. first right arm; 6. second right arm; 7. hinge axle; 8. first left head; 9. second left head; 10. return spring; 11. first right head; 12. second right head; 13. left cavity; 14. right cavity; 15. left support arm; 16. right support arm; 17. left drive lever; 18. first left drive position; 19. second left drive position; 20. right drive lever; 21. first right drive position; 22. second right drive position.

DESCRIPTION OF THE EMBODIMENTS

Figure 1:
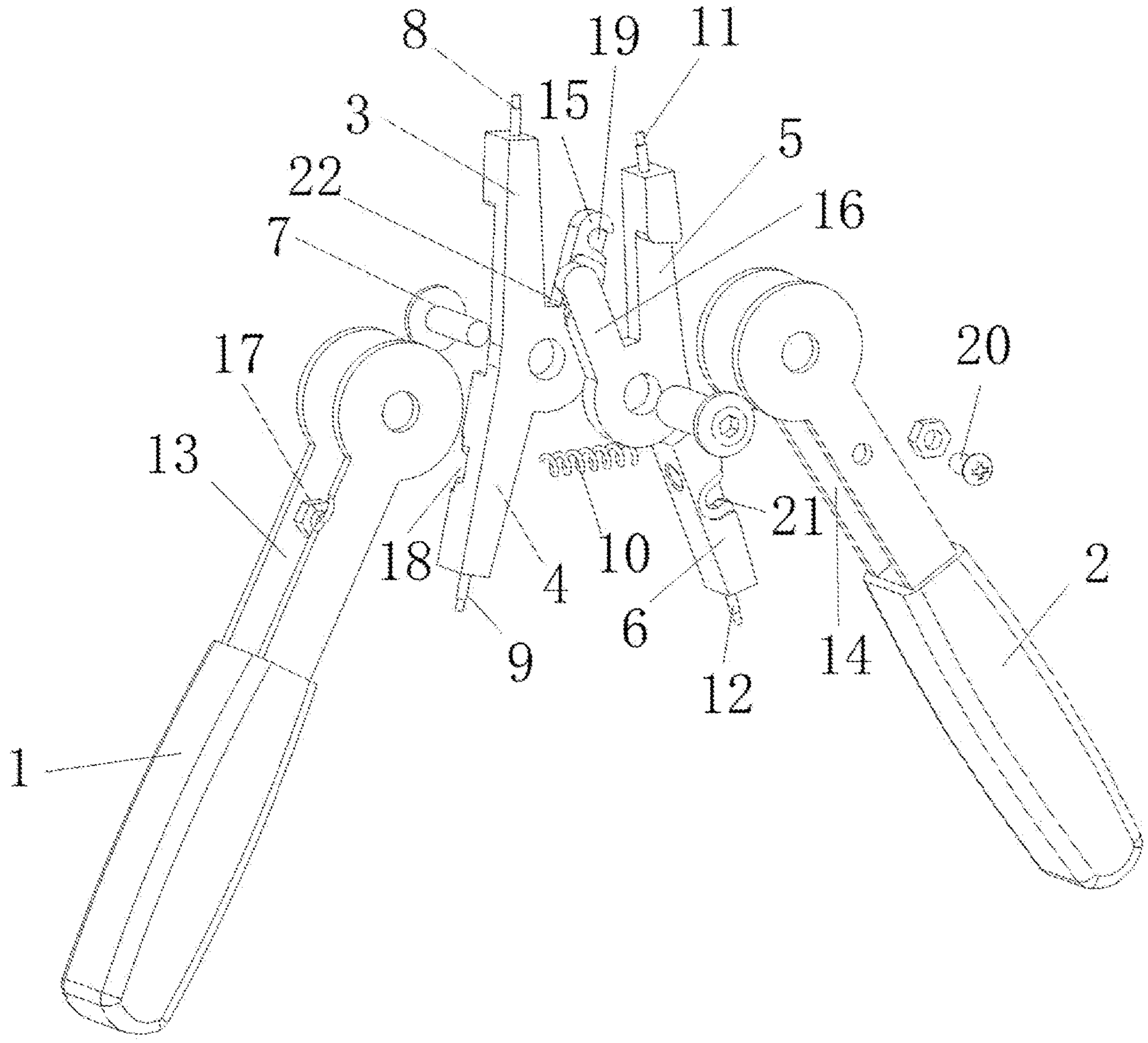
FIG. 1 is a schematic exploded structural view of an embodiment of the present invention.

This embodiment relates to a pair of double-headed retaining ring pliers, as shown in FIG. 1, including handles, a left arm, and a right arm. Middle parts of the left arm and the right arm are hingedly connected by a hinge axle 7, and a position at which the left arm and the right arm are hingedly connected is noted as a hinge point.

A first left head 8 and a second left head 9 are respectively arranged at two end portions of the left arm, the left arm is divided into two sections, one section from the hinge point to the first left head 8 is noted as a first left arm 3, and the other section from the hinge point to the second left head 9 is noted as a second left arm 4. Likewise, a first right head 11 and a second right head 12 are respectively arranged at two end portions of the right arm, the right arm is divided into two sections, one section from the hinge point to the first right head 11 is noted as a first right arm 5, and the other section from the hinge point to the second right head 12 is noted as a second right arm 6.

The handles include a left handle 1 and a right handle 2. An end portion of the left handle 1 is hingedly connected to an end portion of the right handle 2 by the hinge axle 7. To prevent slippage in use, preferably anti-slip patterns are arranged on grips of the handles, the anti-slip patterns may be arranged directly on the handles, or plastic sleeves with anti-slip patterns may be sleeved over the handles.

A left support arm 15 is arranged on the first left arm 3, the left support arm 15 extends from the first left arm 3 in a direction away from the first right arm 5, and an angle between the left support arm 15 and the first left arm 3 is less than 90°, most preferably, ranges from 30° to 60°. A too large or too small angle is convenient for subsequent operations of flipping the handles. A right support arm 16 is arranged on the first right arm 5, the right support arm 16 extends from the first right arm 5 in a direction away from the first left arm 3, and an angle between the right support arm 16 and the first right arm 5 is less than 90°. Similarly, most preferably, the angle ranges from 30° to 60°. Apparently, most preferably, the two angles are kept consistent.

A left drive lever 17 is arranged on the left handle 1, a first left drive position 18 cooperating with the left drive lever 17 is arranged on the second left arm 4, and a second left drive position 19 cooperating with the left drive lever 17 is arranged on the left support arm 16. A right drive lever 20 is arranged on the right handle 2, a first right drive position 21 cooperating with the right drive lever 20 is arranged on the second right arm 6, and a second right drive position 22 cooperating with the right drive lever 20 is arranged on the left support arm 15. The left drive lever 17 and the right drive lever 20 may be protruding blocks or similar protruding rod-like objects fixedly connected to the left handle 1 and the right handle 2.

Figure 2:
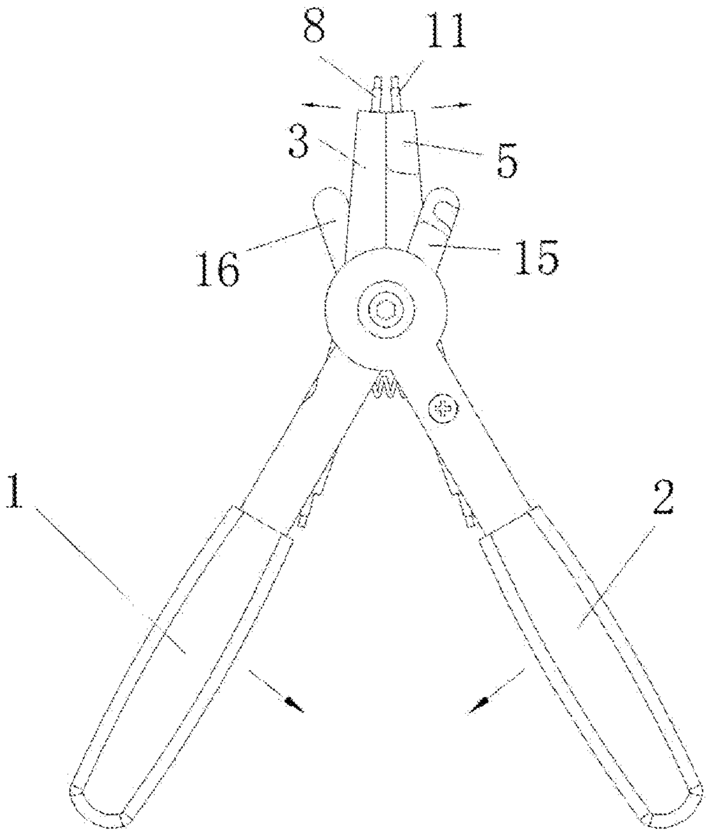
FIG. 2 is a schematic diagram of a state when an outer retaining ring is installed.
Figure 3:
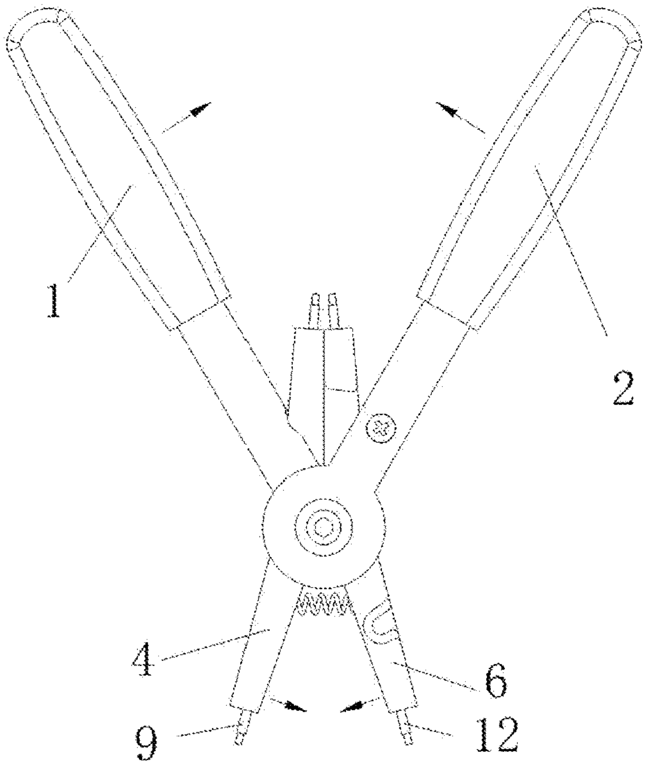
FIG. 3 is a schematic diagram of a state when an inner retaining ring is installed.
Figure 4:
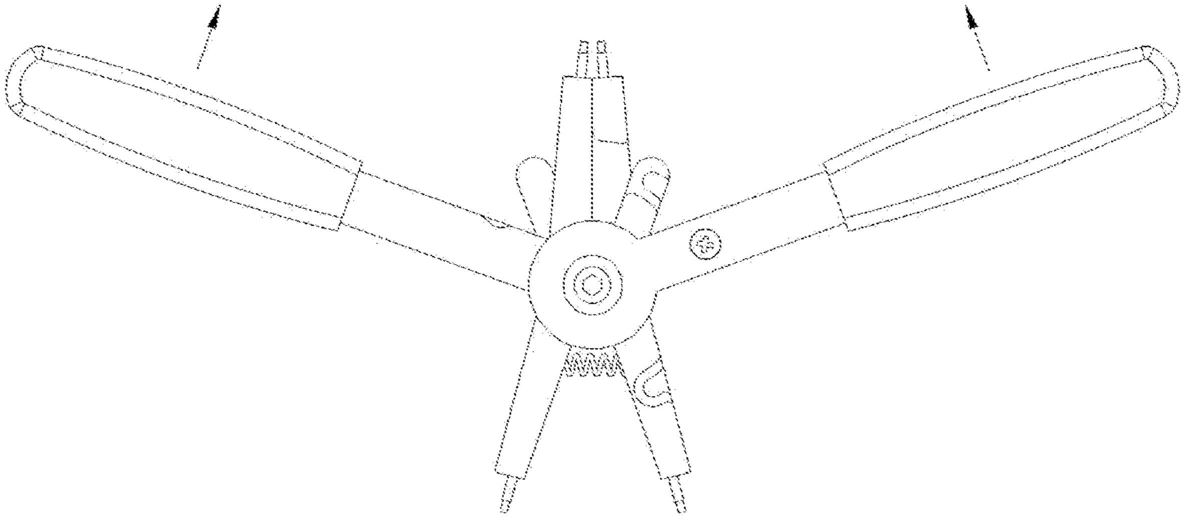
FIG. 4 is a schematic diagram of a process of switching from the state of FIG. 2 to the state of FIG. 3.

A return spring 10 is arranged between the second left arm 4 and the second right arm 6. In use, the retaining ring pliers of this embodiment have two working states: 1) As shown in FIG. 2, when the left drive lever 17 of the left handle 1 abuts against the first left drive position 18, and the right drive lever 20 of the right handle 2 abuts against the first right drive position 21, the left and right handles 1 and 2 are clamped to open the first left head 8 and the first right head 11, for installing an outer retaining ring. 2) As shown in FIG. 4, the handles are flipped, to abut the left drive lever 17 of the left handle 1 against the second left drive position 19 and abut the right drive lever 20 of the right handle 2 against the second right drive position 22, in this case, as shown in FIG. 3, the left and right handles 1 and 2 are clamped to close the second left head 9 and the second right head 12, for installing an inner retaining ring, and after the installation is completed, the return spring 10 returns the left arm and the right arm to initial positions in the state 1).

In this embodiment, the following improvements may be further made:

1) As shown in FIG. 1, a part of the left handle 1 close to the hinge point is provided with a left cavity 13, and in use, the second left arm 4 or the right support arm 16 may extend into the left cavity 13, where the left drive lever 17 is arranged inside the left cavity 13; and a part of the right handle 2 close to the hinge point is provided with a right cavity 14, and in use, the second right arm 6 or the left support arm 15 may extend into the right cavity 14, where the right drive lever 20 is arranged inside the right cavity 14. With the foregoing improvements, the volume occupied by the retaining ring pliers can be reduced, to make it easier to carry and use.

Preferably, both the left drive lever 17 and the right drive lever 20 are screws, and are respectively fixed onto the left handle 1 and the right handle 2 by corresponding nuts. That is, when an outer retaining ring or an inner retaining ring is installed, the screw is plunged into the corresponding left cavity 13 or right cavity 14. Certainly, the left drive lever 17 and the right drive lever 20 may also be fixed onto the left handle 1 and the right handle 2 by welding or riveting.

2) As shown in FIG. 1, left recesses matching the left drive lever 17 are provided at both the first left drive position 18 and the second left drive position 19, and right recesses matching the right drive lever 20 are provided at both the first right drive position 21 and the second right drive position 22. In this way, when an outer retaining ring is installed, the left handle 1 and the right handle 2 firmly cooperate with the left arm and the right arm without shaking; and when an inner retaining ring is installed, the left handle 1 and the right handle 2 firmly cooperate with the right support arm 16 and the left support arm 15 without shaking.

What is claimed is:

1. A pair of double-headed retaining ring pliers, comprising:

handles, a left arm, and a right arm, wherein middle parts of the left arm and the right arm are hingedly connected by a hinge axle, and a position at which the left arm and the right arm are hingedly connected is noted as a hinge point;

a first left head and a second left head are respectively arranged at two end portions of the left arm, the left arm is divided into two sections, one section from the hinge point to the first left head is noted as a first left arm, and the other section from the hinge point to the second left head is noted as a second left arm;

a first right head and a second right head are respectively arranged at two end portions of the right arm, the right arm is divided into two sections, one section from the hinge point to the first right head is noted as a first right arm, and the other section from the hinge point to the second right head is noted as a second right arm;

the handles comprise a left handle and a right handle, wherein an end portion of the left handle is hingedly connected to an end portion of the right handle by the hinge axle;

a left support arm is arranged on the first left arm, the left support arm extends from the first left arm in a direction away from the first right arm, and an angle between the left support arm and the first left arm is less than 90°;

a right support arm is arranged on the first right arm, the right support arm extends from the first right arm in a direction away from the first left arm, and an angle between the right support arm and the first right arm is less than 90°;

a left drive lever is arranged on the left handle, a first left drive position cooperating with the left drive lever is arranged on the second left arm, and a second left drive position cooperating with the left drive lever is arranged on the right support arm;

a right drive lever is arranged on the right handle, a first right drive position cooperating with the right drive lever is arranged on the second right arm, and a second right drive position cooperating with the right drive lever is arranged on the left support arm; and a return spring is arranged between the second left arm and the second right arm.

2. The pair of double-headed retaining ring pliers according to claim 1, wherein a part of the left handle close to the hinge point is provided with a left cavity, and in use, the second left arm or the right support arm may extend into the left cavity, wherein the left drive lever is arranged inside the left cavity; and a part of the right handle close to the hinge point is provided with a right cavity, and in use, the second right arm or the left support arm may extend into the right cavity, wherein the right drive lever is arranged inside the right cavity.

3. The pair of double-headed retaining ring pliers according to claim 2, wherein the left drive lever and the right drive lever are fixed onto the left handle and the right handle by screwing, welding, or riveting.

4. The pair of double-headed retaining ring pliers according to claim 1, wherein anti-slip patterns are arranged on grips of the handles.

5. The pair of double-headed retaining ring pliers according to claim 1, wherein left recesses matching the left drive lever are provided at both the first left drive position and the second left drive position, and right recesses matching the right drive lever are provided at both the first right drive position and the second right drive position.

6. The pair of double-headed retaining ring pliers according to claim 1, wherein the angle between the left support arm and the first left arm ranges from 30 to 60°; and the angle between the right support arm and the first right arm ranges from 30 to 60°.

7. The pair of double-headed retaining ring pliers according to claim 2, wherein anti-slip patterns are arranged on grips of the handles.

8. The pair of double-headed retaining ring pliers according to claim 2, wherein left recesses matching the left drive lever are provided at both the first left drive position and the second left drive position, and right recesses matching the right drive lever are provided at both the first right drive position and the second right drive position.

9. The pair of double-headed retaining ring pliers according to claim 2, wherein the angle between the left support arm and the first left arm ranges from 30 to 60°; and the angle between the right support arm and the first right arm ranges from 30 to 60°.

10. The pair of double-headed retaining ring pliers according to claim 3, wherein anti-slip patterns are arranged on grips of the handles.

11. The pair of double-headed retaining ring pliers according to claim 3, wherein left recesses matching the left drive lever are provided at both the first left drive position and the second left drive position, and right recesses matching the right drive lever are provided at both the first right drive position and the second right drive position.

12. The pair of double-headed retaining ring pliers according to claim 3, wherein the angle between the left support arm and the first left arm ranges from 30 to 60°; and the angle between the right support arm and the first right arm ranges from 30 to 60°.

* * * * *